United States Patent [19]

Siebler

[11] Patent Number: 4,925,229

[45] Date of Patent: May 15, 1990

[54] TILTABLE VEHICLE SEAT

[75] Inventor: Helmut Siebler, Fellbach, Fed. Rep. of Germany

[73] Assignee: Daimler-Benz AG, Stuttgart, Fed. Rep. of Germany

[21] Appl. No.: 298,953

[22] Filed: Jan. 19, 1989

[30] Foreign Application Priority Data

Jan. 19, 1988 [DE] Fed. Rep. of Germany ....... 3801294

[51] Int. Cl.$^5$ ............................................. B60N 1/04
[52] U.S. Cl. .................................... 296/65.1; 297/331
[58] Field of Search ............... 297/331, 335; 296/65.1, 296/68.1

[56] References Cited

U.S. PATENT DOCUMENTS

| 4,408,798 | 10/1983 | Mizushima et al. | 297/335 X |
| 4,484,776 | 11/1984 | Gokimoto et al. | 296/65.1 |
| 4,484,779 | 11/1984 | Suzuki | 297/331 X |
| 4,695,094 | 9/1987 | Siebler | 297/331 |
| 4,700,989 | 10/1987 | Ercilla | 297/331 |

FOREIGN PATENT DOCUMENTS

3507894C2 11/1986 Fed. Rep. of Germany .
104424 6/1982 Japan ................................ 296/65.1
104425 6/1982 Japan ................................ 296/65.1

Primary Examiner—Margaret A. Focarino
Assistant Examiner—Gary C. Hoge
Attorney, Agent, or Firm—Barnes & Thornburg

[57] ABSTRACT

In a vehicle seat tiltable out of its position of use into an access position making it easier to board the vehicle and alight from it, the seat-cushion frame is caught on the vehicle floor by catching claws. To change the seat over into its access position, the backrest held pivotably on the seat-cushion frame first has to be swung down from its erected position of use onto the top face of the seat cushion. An actuating mechanism is coupled to the backrest in such a way that this tilting movement gives rise to a swinging-out movement of the catching claws from the floor mounting. The catching claws are changed over into a masked position safe against causing injury and, in the swung-up seat position, remain in this masked position. When the vehicle seat is tilted back, at the end of the return movement of the backrest the catching claws are released via the actuating mechanism and thereupon automatically swing into the floor mounting.

17 Claims, 6 Drawing Sheets

TILTABLE VEHICLE SEAT

BACKGROUND AND SUMMARY OF THE INVENTION

The invention relates to a tiltable vehicle seat, especially for commercial vehicles, of the type which can be pivoted between an in-use position and a position facilitating easier vehicle access for boarding and exiting.

In a known vehicle seat of this type (German Patent Specification No. 3,507,894) the backrest is held pivotably on two brackets which are provided laterally on the seat cushion and which themselves are displaceable horizontally relative to the seat-cushion frame fastened on a seat underframe. The backrest frame and brackets are coupled to one another via pivoting levers, in such a way that the forward tilting movement of the backrests onto the seat cushion at the same time causes a horizontal displacement of the brackets and consequently of the backrest. In the erected position of use of the backrest, one of the two brackets is supported on a stop face of a toothed element and is thus secured against horizontal displacement. A hand lever for pivoting this toothed element is connected rigidly to the toothed element, which forms part of the actuating mechanism for locking and releasing the seat underframe relative to the vehicle floor. The toothed element is in engagement with a second toothed element, the pivoting movement of which is transmitted via a connecting rod to the catching claw for releasing and locking the seat underframe relative to the floor. A catching claw is arranged on the foot of each of the two rear underframe legs of the seat underframe, so that the transmission consisting of the second toothed element and of the connecting rod is present twice, once on each rear underframe leg. The two toothed elements are connected rigidly to one another by means of a coupling rod.

When the first toothed element is pivoted downwards by means of the hand lever, its pivoting movement results, on the one hand, in a freeing of the bracket and, on the other hand, via the two second toothed elements and the connecting rod, in a swinging of the two catching claws out of the vehicle-integral mounting on the vehicle floor. The backrest can now be tilted onto the seat cushion, and at the same time it is shifted rearwards relative to the seat-cushion frame as a result of the displacement of the brackets. The seat cushion, together with the swung-down backrest, can then be pivoted upwards about the front underframe legs of the seat underframe into approximately vertical alignment, the rear underframe legs swinging against the underside of the seat-cushion frame via coupling rods. This position of the vehicle seat serves to make it easier to mount the vehicle and alight from it, especially where buses or delivery lorries are concerned. A disadvantage of this arrangement is that the catching claws, in their swung-out position, project from the underframe legs and are a source of injuries, especially foot injuries, to the passengers.

An object on which the invention is based is to improve the construction of a vehicle seat of the type mentioned in the introduction, in such a way that any danger of injury on the vehicle seat in its swung-up access position is avoided.

In a vehicle seat of the above noted type, this object is achieved according to the invention, by providing a seat arrangement wherein the actuating mechanism is coupled to the backrest in such a way that the tilting movement of the backrest results in a swinging-out movement of the catching claw means and the erecting movement of the backrest results in a swinging-in movement of the catching claw means with respect to the mounting located on the vehicle, and wherein the catching claw means is arranged so that, in its swung-out position, it is arranged concealed.

In the vehicle seat according to preferred embodiments of the invention, when the backrest is tilted after being released in the position of use the locking claw or locking claws are necessarily swung out of the mounting integral with the vehicle and changed over into a masked position, in which they are drawn into the seat-cushion frame or, if a seat underframe is connected to the seat-cushion frame, into the seat underframe. The changeover takes place automatically, in a way substantially improving the ease of operation, by swinging down the backrest, specifically as early as when the seat-cushion frame is still in its position of use. With the seat-cushion frame raised vertically and the backrest swung to, each catching claw no longer projects into the access space, but is set back completely behind seat parts, so that it is masked by large-surface seat parts, at least in the boarding and alighting direction, and can no longer be touched. When the vehicle seat is swung back, each catching claw is again brought out of its concealed swung-out position for swinging into the floor mounting only as a result of the erection movement of the back-rest, but the seat-cushion frame has then already assumed its position of use again. The positive coupling of the pivoting movements of the catching claw and backrest ensures, that, when the seat is raised, each catching claw does not remain extended, even inadvertently, and does not project into the access region for the vehicle passengers.

Measures are provided in certain preferred embodiments of the invention which make it impossible, on the one hand, for the vehicle seat to be released from the floor too early, that is to say before the backrest is tilted sufficiently far towards the seat cushion, and, on the other hand, for the catching claw to be swung out too early during the tilting back of the seat, that is to say before the seat-cushion frame or its underframe has touched the vehicle floor. Injuries during the tilting of the vehicle seat can also thereby be prevented reliably. A spring tensioned during the tilting of the backrest and functioning as a drive for the catching claw, is provided in certain preferred embodiments of the invention, which ensures that the catching claw swings into the mounting on the vehicle floor automatically and reliably, as soon as the locking of the catching claw in its swung-out position at the end of the return movement of the backrest into the erect position of use is cancelled again.

On vehicle seats of which the seat-cushion frame is connected to the vehicle floor via a seat underframe, a catching claw is arranged on each rear underframe leg of the seat underframe in a known way. In this case, in an expedient embodiment of the invention, the catching claws are arranged pivotably inside the hollow underframe feet, so that, in their swung-out position, they swing completely into the underframe feet. The fact that the rear underframe feet swinging up into the vertical access position together with the seat-cushion frame are covered with flexible foam also contributes to increased safety according to certain preferred embodiments.

The constructive measures of the preferred embodiments described below further contribute as a whole to a productively simple and mechanically reliable embodiment of the actuating mechanism for the catching claws.

Other objects, advantages and novel features of the present invention will become apparent from the following detailed description of the invention when considered in conjunction with the accompanying drawings.

DETAILED DESCRIPTION OF THE DRAWINGS

Figure 1:
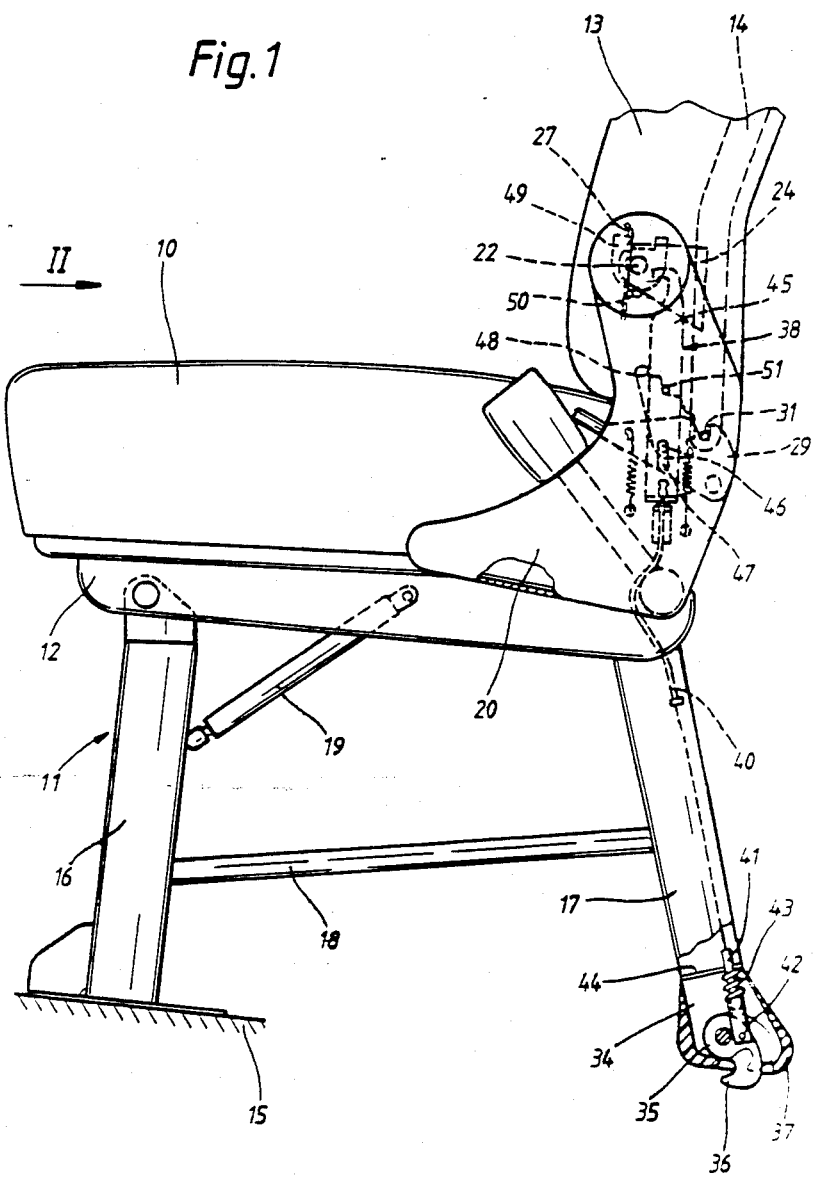
FIG. 1 schematically shows, in cutout form, a side view of a tiltable front-passenger seat for a bus constructed according to a preferred embodiment of the invention.
Figure 2:
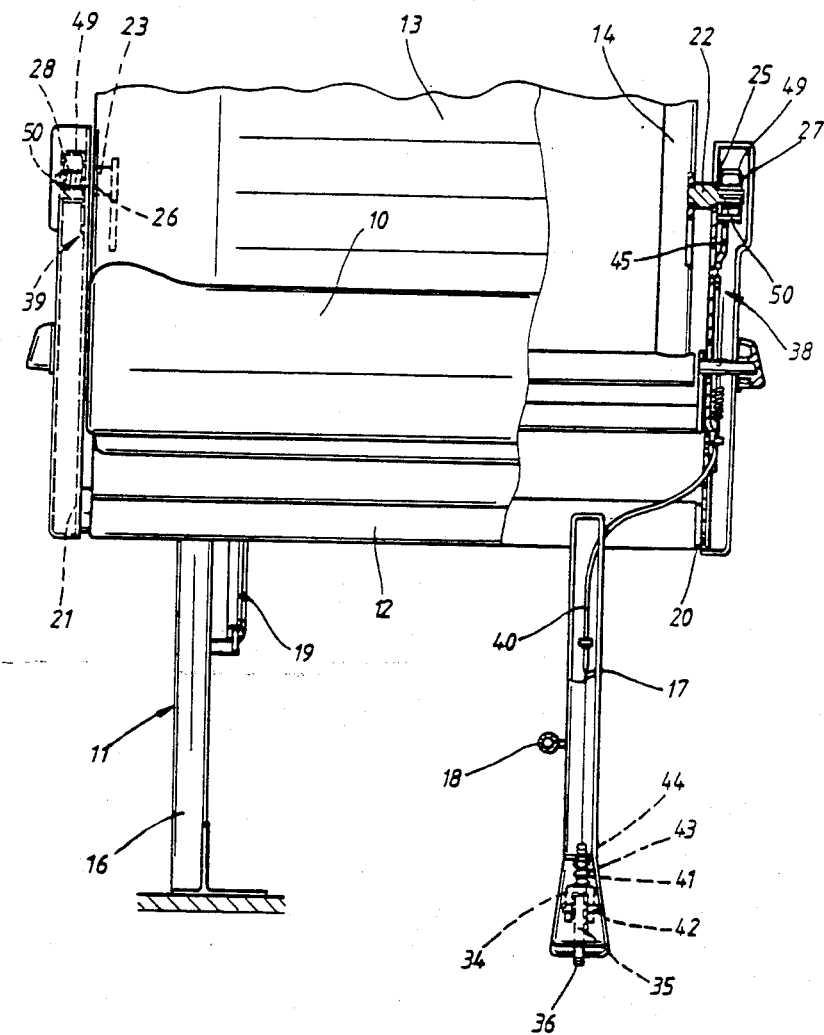
FIG. 2 shows a front view of the seat of FIG. 1 in the direction of the arrow II, in a partial offset cross-section.

The front-passenger seat of a bus, as an example of a vehicle seat and shown in cutout form respectively in a side view in FIG. 1 and in a front view in FIG. 2, consists essentially of a seat-cushion 10, with a seat-cushion frame 12 resting on a seat underframe 11, and of a backrest 13 with a backrest frame 14. The seat underframe 11 has four underframe legs connected pivotably to the seat-cushion frame 12, specifically two front underframe legs 16 anchored firmly to the vehicle floor 15 and two rear underframe legs 17 selectively connectable to and releasable from the vehicle floor 15.

In FIG. 2, a front underframe leg 16 is shown in the left-hand half of the view and a rear underframe leg 17 in the right-hand half. In each case one front underframe leg 16 and one rear underframe leg 17 are connected to one another via a coupling rod 18. The coupling rods 18 ensure that, when the seat-cushion frame 12 is pivoted about the front underframe legs 16 in the anti-clockwise direction (FIG. 1) the rear underframe legs 17 are swung up against the underside of the seat-cushion frame 12. The pivoting movement of the seat-cushion frame 12 approximately into the vertical is assisted by two pneumatic springs 19 which are articulated repsectively on the seat-cushion frame 12 and on a front underframe leg 16.

The seat-cushion frame 12 carries laterally two bearing plates 20, 21, in which the backrest 13 is mounted pivotably. The pivotability is ensured by two bearing journals 22, 23 which project laterally away from bearing webs 24 (FIG. 1) connected to the backrest frame 14 and which pass through corresponding bearing orifices 25, 26 (FIG. 2) in the bearing plate 20, 21. Located on each bearing journal 22, 23 is a leg spring 27, 28 which is supported on the one hand on the backrest frame 14 and on the other hand on the bearing plate 20, 21 and which assists the backrest 13 in its pivoting movement towards the seat cushion 10.

As can be seen especially from the enlarged representations of FIGS. 3 to 6, the locking of the backrest 13 in its erect position of use is carried out by means of a detent lever 29 which is arranged pivotably on the bearing plate 20 and which by means of a grab groove 30 surrounds a cam 31 projecting laterally from the backrest frame 14 and by means of a detent nose 55 engages behind it. The detent lever 29 is stressed by a tension spring 32 which pulls it back into its locking position locking the backrest 13. A release button 33 arranged on one lever arm of the detent lever 29 serves for pivoting the detent lever 29 manually out of its locking position, with the result that the detent lever 29 frees the cam 31 and the backrest 13 executes, under the effect of the leg springs 27, 28, a pivoting movement directed towards the seat-cushion 10.

In order to lock the tiltable vehicle seat to the vehicle floor 15, a catching claw 35 is arranged pivotably in each hollow foot 34 of the rear underframe legs 17. The catching claws 35 can be pivoted into two positions by means of an actuating mechanism still to be explained in detail. In the so-called swung-in position represented by unbroken lines in FIG. 1, the catching claws 35 protrude from the feet 34 and can grip round a mounting (not shown) on the vehicle floor 15. Such a mounting can consist, for example, of a round web which is arranged in a floor depression and behind which the catching nose 36 of the catching claws 35 engages. In the other pivoting position of the catching claws 35, namely the so-called swung-out position represented by dash lines in FIG. 1, the catching claws 35 are drawn completely into the feet 34 of the rear under-frame legs 17. Moreover, the feet 34 are covered with flexible foam 37, with the exception of the passage orifice for the catching claws 35.

The actuating mechanism for pivoting the catching claws 35 consists of two identical transmission units 38, 39 (FIG. 2) which are each arranged on a bearing plate 20, 21. The transmission unit 38 on the bearing plate 20 is described below, this description also applying equally to the transmission unit 39 on the bearing plate 21. Each transmission unit 38 and 39 acts via a cable pull 40 on one of the two catching claws 35 arranged in the rear underframe legs 17. For this purpose, the cable pull 40 is fastened, at its end located on the catching-claw side, to a fork-shaped coupling member 41 which is connected in an articulated manner to the catching claw 35 via a bolt 42 passing through its two legs engaging over the catching claw 35 and through the catching claws 35. Arranged on the stock of the coupling member 41 is a helical compression spring 43 which is supported on the one hand on the fork branch and on the other hand on a transverse web 44 in the underframe leg 17. During the pivoting of the catching claw 35 into its swung-out position, the spring 43 is tensioned and thereby ensures an automatic return of the catching claw 35 into its swung-in position. The cable pull 40 extends through the hollow rear underframe leg 17 up to the bearing plate 20 and there is connected, at its end located on the transmission side, to a slide 45 which is displaceably guided approximately vertically on the bearing plate 20 by means of a pin/slot guide consisting of a pin 46 projecting laterally from the bearing plate 20 and of a slot 47 arranged in the slide 45. Moreover, the pin 46 at the same time forms the pivot pin for the detent lever 29 of the backrest locking mechanism and for a pawl 48 which is yet to be explained and which, like the slide 45, is part of the transmission unit 38.

The slide 45, at its front end facing away from the engagement end of the cable pull 40, carries a hook 451 which interacts with a driver 49 fastened to the backrest 13. As can be seen in FIGS. 1 and 2, the driver 49 rests rigidly on the bearing journal 22 (or 23 for the transmission unit 39) and rotates together with the pivoting movement of the backrest 13. The driver 49 carries a round web 50 which, when the driver 49 rotates, executes a circular movement and which comes into engagement with the hook 451 of the slide 45 over a portion of its circular movement and thereby drives the slide 45 in a lifting movement. This lifting movement is transmitted via the cable pull 40 to the catching claw 35 which is thereby changed over, under the tensioning of the spring 43, into its swung-out position, represented by dot-and-dash lines in FIG. 1, in which it is drawn completely into the foot 34 of the rear underframe leg 17.

Figure 4:
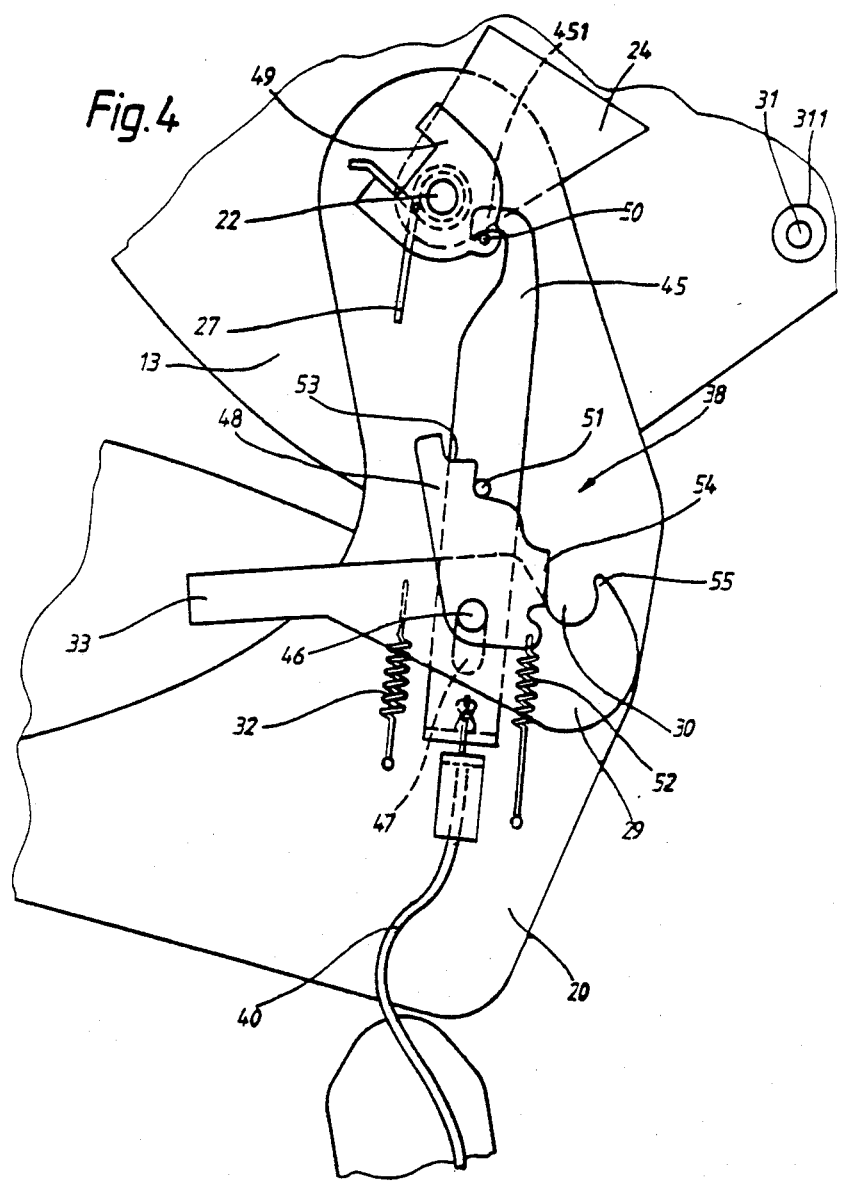
Figure 5:
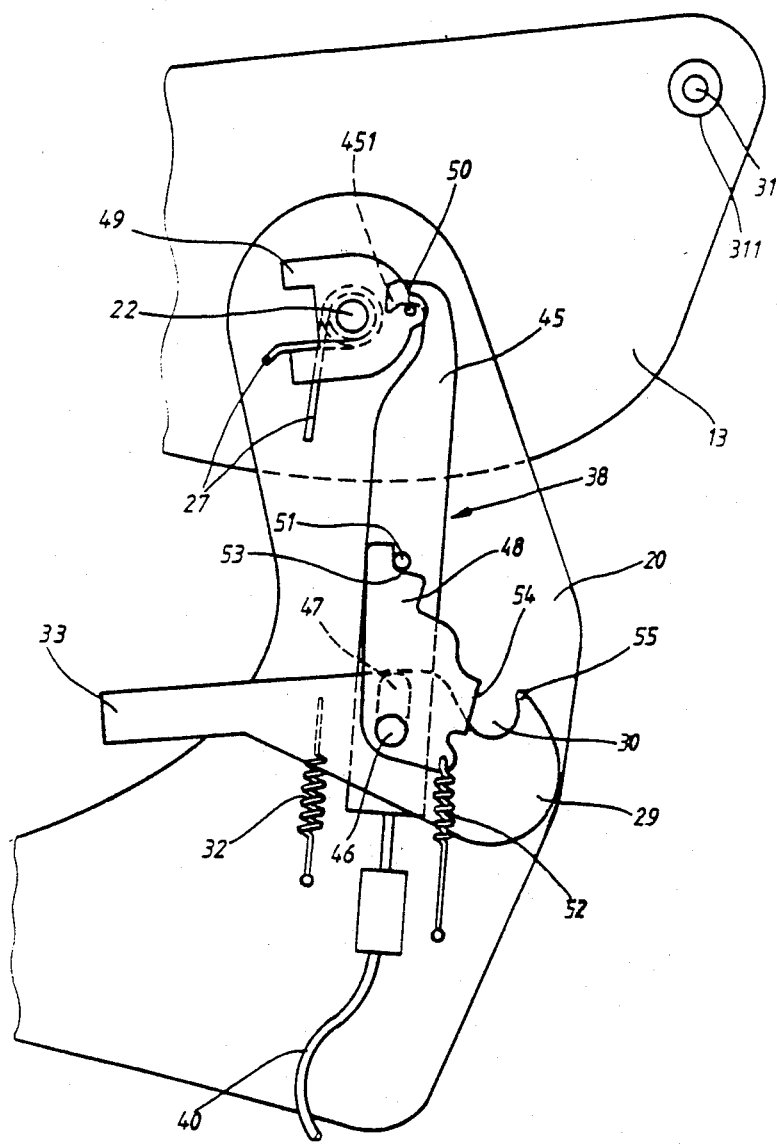

As already mentioned, arranged rotatably on the pin 46 is a pawl 48 which interacts with a locking pin 51 on the slide 45. The pawl 48 rests against the locking pin 51 under the efrect of a tension spring 52. As soon as the slide 45 has executed such a lifting movement that the catching claw 35 is changed over to its swung-out position within the foot 34, the pawl 48 swings with a catching recess 53 under the locking pin 51 and thus locks the slide 45 in this maximum lifting position (FIG. 5). The cam 31 arranged on the backrest 13 and belonging to the backrest locking mechanism is used to release the slide 45 again and, on its free end face, carries a portion of widened diameter serving as a lifting-out cam 311 for the pawl 48. For this purpose, the pawl 48 carries a stop 54 which is so designed and arranged that, immediately before the assumption of the erected end position of the backrest 13 and the associated falling of the cam 31 into the grab groove 30 of the detent lever 29, the lifting-out cam 311 comes up against the stop 54 and pivots the pawl 48 in the anti-clockwise direction in FIGS. 3 to 6, with the result that the catching recess 53 swings away from under the locking pin 51 and the slide 45 is consequently freed to be returned by the cable pull 40.

To allow access for boarding the bus and/or alighting from it, the vehicle seat shown in its basic position in FIG. 1 can be brought into a vertical access position, in which the backrest 13, pivoted through approximately 90°, rests on the seat cushion 10, the seat-cushion frame 12 extends vertically approximately in the extension of the stationary front underframe legs 16, and the rear underframe legs 17 are swung against the underside of the seat-cushion frame 12 via the coupling rods 18. The functioning of the actuating mechanism consisting of the two transmission units 38 and 39 and intended for releasing and pivoting the catching claws 35 can be illustrated most clearly by means of the different positions of the transmission unit 38 in FIGS. 3 to 6, the backrest 13 being in its erected position of use in FIG. 3, immediately preceding its position of use in FIG. 6 and being in two different tilting positions in FIGS. 4 and 5.

Figure 3:
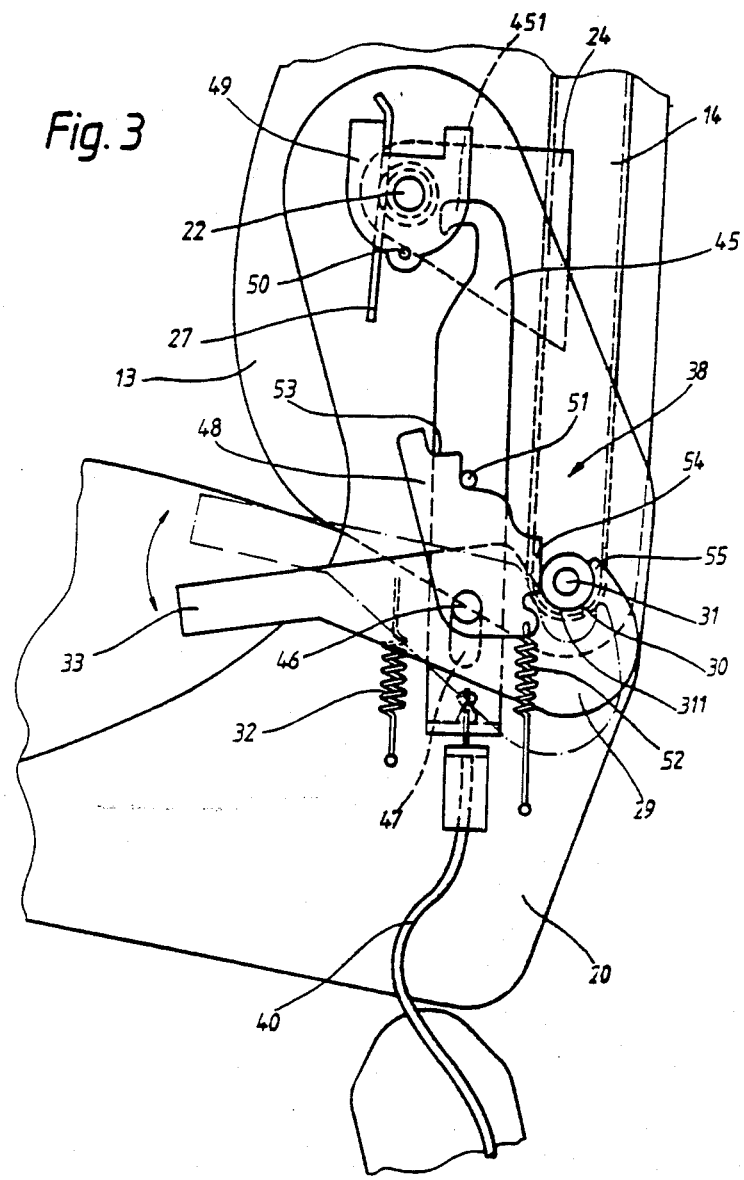
FIGS. 3 to 6 each show an enlarged cutout of the seat of FIGS. 1 and 2 in the region of the actuating mechanism for the catching claws, with the backrest in four respective different pivoting positions.
Figure 6:
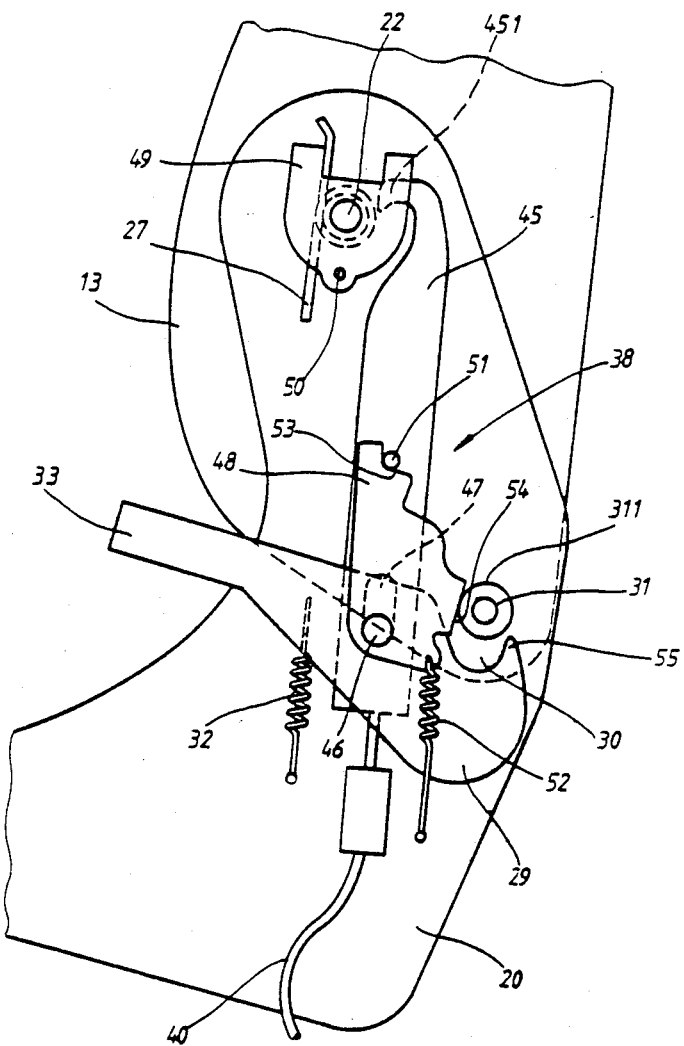

As indicated by a double arrow in FIG. 3, in order to release the backrest 13, the release button 33 of the backrest locking mechanism must be pivoted upwards counter to the force of the tension spring 32. The cam 31 thereby comes out of engagement with detent lever 29, and the backrest 13 swings towards the seat cushion 10 in the anti-clockwise direction under the driving force of the two leg springs 27, 28. With the pivoting of the backrest 13, the lifting-out cam 311 frees the pawl 48 which comes up against the locking pin 51 on the slide 45 under the force of the tension spring 52. Together with the backrest 13, the driver 49 begins to rotate, and its round web 50 describes a path in the form of a circle arc (FIG. 4). When the backrest 13 has covered somewhat more than half its pivoting travel, the round web 50 comes into engagement with the hook 451 on the slide 45 (FIG. 4). With further pivoting, the driver 49, via its round web 50 , lifts the slide 45 vertically upwards (FIG. 5), so that, via the cable pull 40, the slide 45 changes the catching claw 35 over from its swung-in position represented by unbroked lines in FIG. 1 into its swung-out position represented by dash lines in FIG. 1. During this pivoting of the catching claw 35, the spring 43 in the foot 34 is tensioned. When the slide 45 has reached its maximum lifting position, the pawl 48 resting under spring stress against the locking pin 51 slides with its catching recess 53 under the locking pin 51 and retains the slide 45 in this maximum lifting position (FIGS. 5 and 6). In this position, the backrest 13 has also reached its full tilting position and rests on the seat-cushion 10. The seat-cushion 10, with the backrest 13 swung to, can now be raised into the access position described, the pneumatic springs 19 assisting this pivoting movement of the seat-cushion frame 12, together with the seat-cushion 10 and backrest 13, which takes place in the anti-clockwise direction in FIG. 1. The rear underframe legs 17 are laid against the underside of the seat-cushion frame 12 via the coupling rods 18. Because the catching claws 35 are drawn into the feet 34 of the rear underframe legs 17 and because the feet 34 are covered with flexible foam 37, no vehicle passenger can injure himself in any way on the raised seat when passing through the access spaced opened up by the vehicle seat.

In order to return the vehicle seat to its position of use shown in FIG. 1, the seat-cushion frame 12, together with the seat underframe 11 and the swung-to backrest 13, first has to be swung back into its position of use. The rear underframe legs 17 are thereby automatically extended downwards via the coupling rods 18 and set down on the vehicle floor 15. The catching claws 35 are still drawn into the feet 34, as before. The backrest 13 is now erected in the clockwise direction, the round web 50 of he driver 49 coming out of engagement with the hook 451 of the slide 45 (FIG. 6). However, the slide 45 is locked in its maximum lifting position, as before, via the pawl 48, sot that the catching claw 35 also maintains its swung-in position via the cable pull 40. Shortly before the backrest 13 reaches its erected end position, the lifting-out cam 311 swings up against the stop 54 of the pawl 48 and pivots the latter in the anti-clockwise direction counter to the force of the tension spring 52. The catching recess 53 thereby slides away from under the locking pin 51 and the slide 45 is released. The tensioning spring 43 now shifts the catching claw 35 into its swung-in position, in which the catching nose 36 engages into the mounting of the vehicle floor 15 and automatically catches the rear under frame leg 17 on the vehicle floor 15. During the pivoting of the catching claw 35, the slide 45 is pulled back into its basic position via the cable pull 40. The cam 31 moves up against the detent lever 29 and pivots the latter counter to the force of the tensioning spring 32, until it falls into the grab groove 30 when the end position of the back rest is reached. In this position, the tensioned spring 32 pulls the detent lever 29 back into the basic position, in which the detent nose 55 on the detent lever 29 engages behind the cam 31 and thus locks the back rest 13 securely.

What is claimed:
1. Tiltable vehicle seat comprising:

a seat-cushion frame having a seat cushion and being pivotable out of an approximately horizontal position of use into an approximately vertical access position making access to the vehicle easier, a backrest which is pivotable on the seat-cushion frame and which can be tilted forwards onto the seat cushion after the release of a locking mechanism fixing it in an erected position of use, catching claw means for retaining the seat-cushion frame in its position of use and which can be swung into and out of a mounting integral with the vehicle by means of an actuating mechanism, and concealing means for concealing the catch claw means when swung out of the mounting, wherein the actuating mechanism is coupled to the backrest in such a way that the tilting movement of the backrest results in a swinging-out movement of the catching claw means and an erecting movement of the backrest results in a swinging-in movement of the catching claw means with respect to the mounting located on the vehicle, and wherein the catching claw means is arranged so that, in its swung-out position, it is arranged concealed, and wherein the swinging out of the catching claw means takes place after approximately half the tilting travel of the backrest and the swinging in of the catching claw means takes place at the end of the erection travel of the backrest, and wherein the catching claw means is locked in its swung-out position during the intermediate pivoting travel of the backrest.

2. Seat according to claim 1, comprising a spring loading the catching claw means in the swinging-in direction is compressed with the swinging out of the catching claw means.

3. Seat according to claim 1, wherein the seat-cushion frame is equipped with a tiltable seat underframe, on which underframe the catching claw means is arranged pivotably in such a way that, in its swung-out position, it is drawn into the seat underframe.

4. Seat according to claim 3, wherein the seat underframe has four underframe legs which are connected pivotably to the seat-cushion frame, and wherein two front underframe legs are connected firmly to the vehicle floor and two rear underframe legs which each have a hollow foot and which each receive a respective catching claw of the catching claw means pivotably in their hollow foot, in such a way that the catching claws are drawn into the feet in their swung-out position.

5. Seat according to claim 4, wherein each foot of the rear underframe legs is surrounded by flexible foam.

6. Seat according to claim 4, wherein the backrest is mounted pivotably on two bearing plates arranged laterally on the seat-cushion frame, and wherein the actuating mechanism has two identical transmission units, each of which is arranged on a bearing plate.

7. Seat according to claim 6, wherein, for its pivoting movement, each catching claw is connected to the associated transmission unit of the actuating mechanism via a cable pull.

8. Seat according to claim 7, wherein each transmission unit comprises:

a hook which is displaceable approximately vertically on the bearing plate and to which is fastened the end of the cable pull located on a transmission side of the cable pull, a driver which is fastened to the backrest frame and executes a circular movement during the pivoting of the backrest and comes into engagement with the hook over a portion of its circular movement and drives the latter to execute a lifting movement, a locking pin fastened to the hook, and a pawl which rests against the locking pin under spring load, is pivotable on the bearing plate and has at least one catching recess for receiving the locking pin in the end lifting position of the hook, and a spring for loading the pawl when resting against the locking pin.

9. Seat according to claim 8, wherein a restoring spring with a spring force directed counter to the lifting movement acts on the hook via the cable pull.

10. Seat according to claim 9, wherein each transmission unit has a lifting-out cam which is arranged on the backrest frame and executes a circular movement during the pivoting of the backrest and which, at the end of the erection movement of the backrest, comes in contact with the pawl in order to pivot the latter counter to the spring force for the purpose of disengaging the locking pin and catching recess.

11. Seat according to claim 10, wherein a further cam which belongs to a backrest locking mechanism is arranged on the backrest frame, preferably coaxially relative to the lifting-out cam, said further cam being configured to fall into a grab groove arranged in a detent lever and intended for locking the backrest in the erection position of the backrest and wherein the detent lever carries a release button for manually pivoting same.

12. Seat according to claim 11, wherein a detent spring with a spring force causing a rotary movement of the detent lever in the locking direction acts on the detent lever.

13. Seat according to claim 4, wherein a spring is provided in each underframe leg which is designed as a helical compression spring which is supported on the one hand on the respective under-frame leg and on the other hand on one lever arm of a respective catching claw designed as a two-armed lever.

14. Seat according to claim 6, wherein two leg springs are provided for forcibly bringing about the tilting movement of the backrest and which are supported on the one hand on the backrest frame and on the other hand on the respective associated bearing plate.

15. Seat according to claim 4, wherein a pneumatic spring is braced between the seat-cushion frame and at least one front underframe leg.

16. Seat according to claim 4, wherein the swinging out of the catching claw means takes place after approximately half the tilting travel of the backrest and the swinging in of the catching claw means takes place at the end of the erection travel of the backrest, and wherein the catching claw means is locked in its swung-out position during the intermediate pivoting travel of the backrest.

17. Seat according to claim 9, wherein the swinging out of the catching claw means takes place after approximately half the tilting travel or the backrest and the swinging in of the catching claw means takes place at the end of the erection travel of the backrest, and wherein the catching claw means is locked in its swung-out position during the intermediate pivoting travel of the backrest.

* * * * *